No. 886,431. PATENTED MAY 5, 1908.
E. C. SMITH.
SHIFTING DEVICE.
APPLICATION FILED DEC. 23, 1905.
2 SHEETS—SHEET 2.
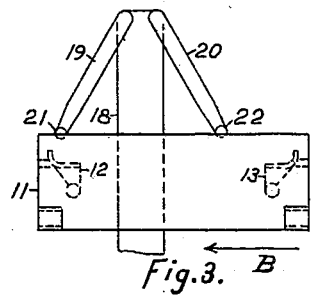
Fig. 3.
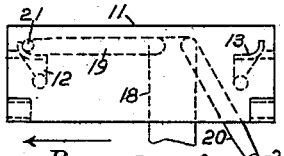
Fig. 4.
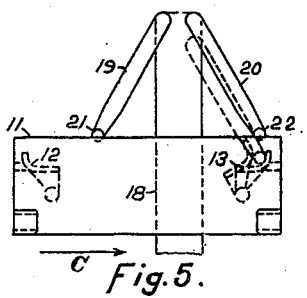
Fig. 5.
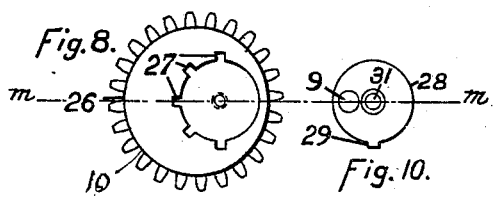
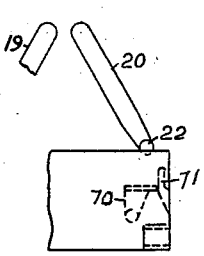
Fig. 13.
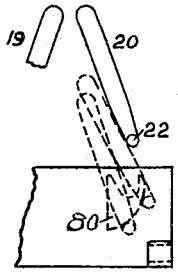
Fig. 14.
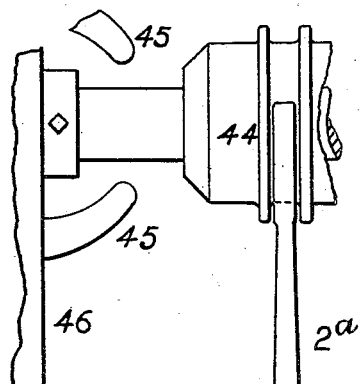
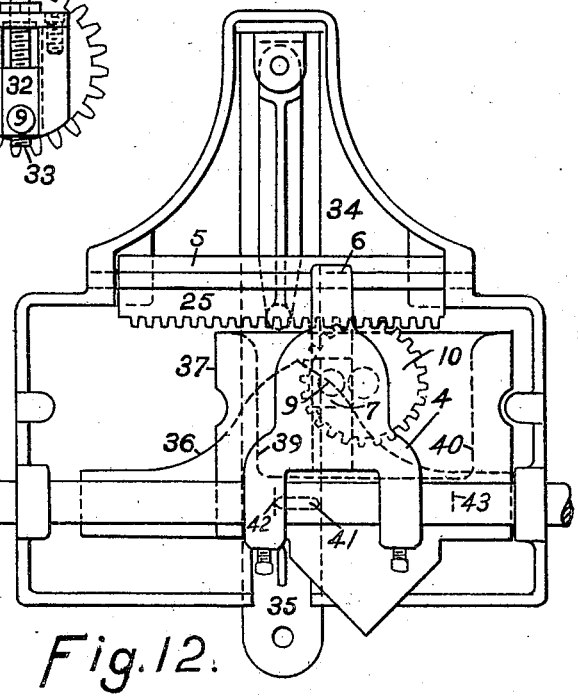
Fig. 12.
WITNESSES:
Arthur L. Bryant
B. C. Rust
E. C. Smith INVENTOR:
By Foster, Freeman & Watson
Attys
THE NORRIS PETERS CO., WASHINGTON, D. C.

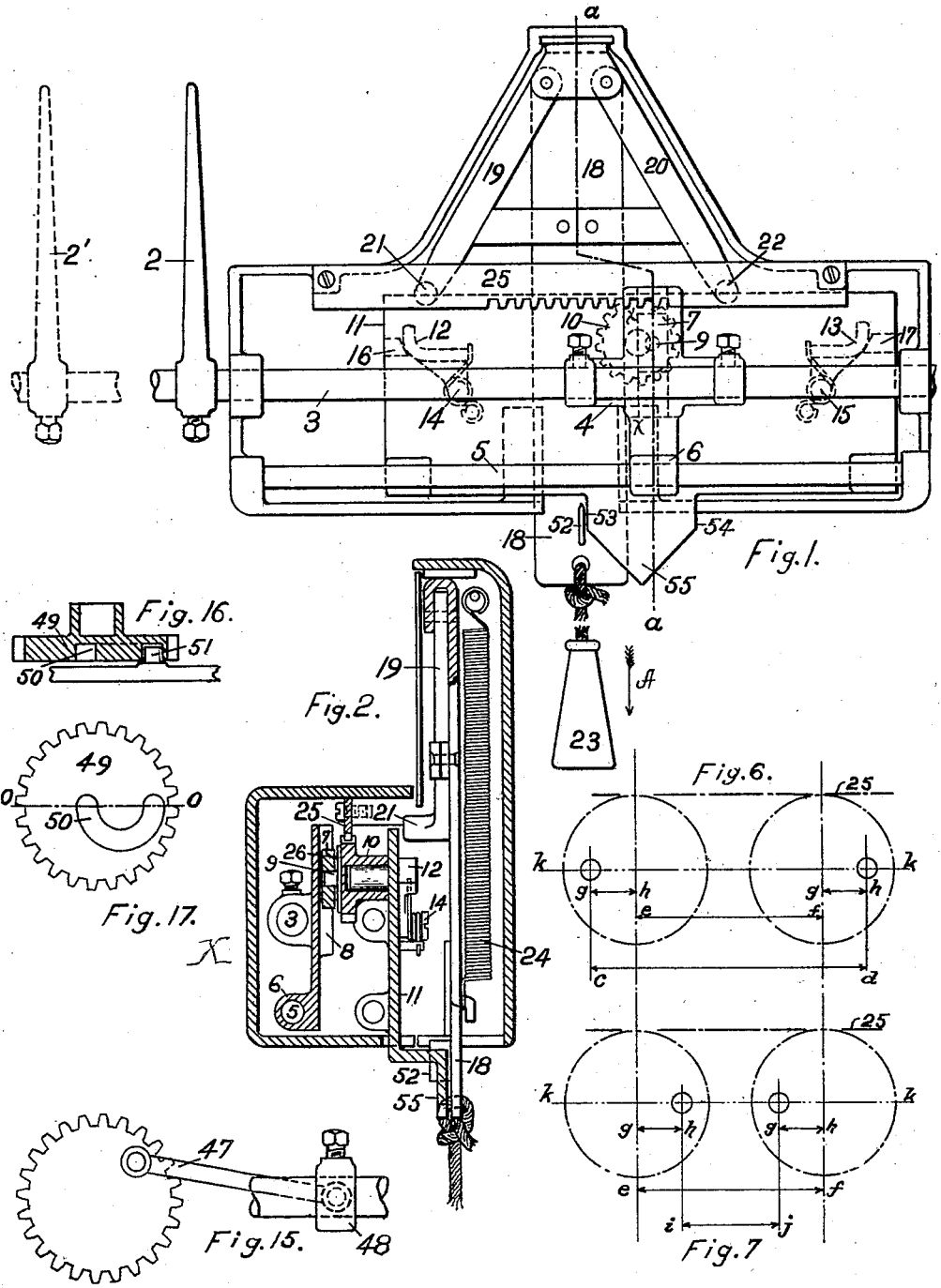

UNITED STATES PATENT OFFICE.

EDWIN C. SMITH, OF PAWTUCKET, RHODE ISLAND.

SHIFTING DEVICE.

No. 886,431.  Specification of Letters Patent.  Patented May 5, 1908.

Application filed December 23, 1905. Serial No. 293,138.

*To all whom it may concern:*

Be it known that I, EDWIN C. SMITH, a citizen of the United States, residing at Pawtucket, in the county of Providence and State of Rhode Island, have invented certain new and useful Improvements in Shifting Devices, of which the following is a specification.

My invention is an improved mechanism for shifting a movable element as a belt, clutch or machine member from one of two alternative positions to the other.

The purpose of the invention is to produce a device which will provide a maximum extent of such shifting with a minimum movement of actuation, which shall be compact, and which shall have simple provision for varying the extent of shifting.

The means whereby the foregoing purposes are attained are fully set forth in the following specification, of which the accompanying drawings are a part.

These said drawings represent respectively: Figure 1, a front elevation of my device; Fig. 2 a side elevation in section, partially on line $a$—$a$ of Fig. 1, and partially on line $x$—$x$ of same figure. Figs. 3, 4, 5, 6 and 7, diagrammatic views showing details of operation and structure; Fig. 8, the plan view of one form of adjustable crank; Fig. 9, the elevation view of same in section on line $m$—$m$ of Figs. 8 and 10; Fig. 10, a detail of same; Fig. 11, a further form of adjustable crank; Figs. 12, 13, 14, 15, 16, 17 and 18, further modifications, some shown diagrammatically and others constructionally.

The principal elements of the structure are the actuated element 2, which is connected as shown to shift a belt shipper fork, the actuating element 18 which is shown as a vertically reciprocating slide, a carrier 11 shown as a shipper slide, and intermediate adjustable devices, whereby alternate uniform movements in the same direction of the actuating element will shift the actuated element first in one direction and then in the other. The intermediate devices are so constructed, arranged and adjusted, however, that while the movements of the actuating element are not varied, the extent of movement of the actuated element may be changed, thus, in the case of a belt shifter, adapting the structure for use with belts of different widths.

In Fig. 1, the movable element must be shifted from the position shown to that indicated by its dotted representation 2'. This shipper fork 2 is secured to the shipper bar or rod 3, to which is likewise secured the slide or shipper cross-head 4. The shipper cross-head 4 is guided by a guide rod 5, which runs through the bearing 6, in the cross head 4. A shoe 7 works in a groove 8 in the face of the cross-head, and the bottom of the groove 8 maintains the shoe 7 on its crank pin 9— see Fig. 2. The crank pin 9 is a part of the gear crank 10 which is carried on the shipper slide 11. Attention is directed to the fact that, because of the relation of the shipper cross-head 4 and the shipper slide 11, both the gear crank 10 and the shoe 7 are held in place without screws, cotter pins or other fastenings. The carrier or shipper slide 11 is movable in or on suitable bearings, and in a direction parallel with that of the cross-head 4 and its attached shipper and shipper rod. The shipper slide has two pockets 12 and 13, which may be in or on projections of the slide and are preferably hinged at 14 and 15 so they can be raised and lowered. Stops at 16 and 17 prevent downward movement below their normal positions of 12 and 13.

Movable transversely of the carrier 11 is the actuating element or handle slide 18, having at its top two pawls 19 and 20, at the lower extremities of which are projections 21 and 22 which are adapted to engage, respectively, at proper times, the shoulders of two pockets 12 and 13. At the bottom of the handle slide 18 is secured, usually by a cord, a suitable handle 23, by which the handle slide 18 is shifted in the direction of the arrow A, usually by pulling the handle 23. The spring 24 serves to return the handle slide 18 to its initial position after it has been shifted by the handle 23. All of said parts are inclosed by a suitable casing X.

With the parts related to each other as in Fig. 3, a downward movement of the handle slide 18 will, cause the pawl 19 to engage, by its projection 21, the shoulder of the pocket 12. Due to the angular relation of the pawl to the handle slide 18, the downward movement of the latter causes a toggle action on the part of the pawl 19 which, because its extremity engages the pocket 12, shifts the shipper slide 11 in the direction of the arrow B, as indicated in Fig. 4. This brings the pocket 13 directly over the projection 22 of the pawl 20, so that when the handle slide 18 is again raised, the projection 22 engages the pocket 13, raises and passes it, and reaches a position as in Fig. 5, directly above it, just as in Fig. 3 the projection 21 was directly above the pocket 12. Obviously, if the handle slide 18 is again pulled down, the engagement of the pawl 20, by its projection 22 with the pocket 13, will cause the shipper slide 11 to move in the direction of the arrow C, just as the engagement of the pawl 19 with the pocket 12 caused its movement in the direction of the arrow B.

The gear crank 10 which has been referred to above as incorporate with the crank pin 9, is preferably of circular form, with a toothed periphery. Its teeth mesh with a rack 25, and its movement along the rack is of such extent as to impart to itself a half rotation. And as the gear-crank 10 is carried on and by the shipper slide 11, the proportions and relations of the pawls 19 and 20 with respect to the shipper slide 11 and the handle slide 18, must be such as to cause a movement of the shipper slide 11 that will result in a half rotation of the crank 10, in order to secure the full benefit of the throw of the crank pin 9.

Attention is directed to the easy action of this combination. The crank pin 9 starts its motion from and ends it on the dead center, with reference to the straight line movement of the cross-head 4. Therefore, the latter always starts with a gradually accelerated and consequently easy motion, and requires little force to start it. Further, because its throw begins and ends on the dead center, the crank pin 9 acts as a lock, preventing the cross-head 4 from shifting of itself, or by any tendency of the belt or belt controlling parts other than those devised for that purpose.

The shipper slide 11 is, in turn, locked against movement in either terminal position by the projection 52 of the handle slide 18, which projection engages either the shoulder 53 or 54 of the triangular, dependent portion 55 of the shipper slide 11. The dependent, triangular portion of the shipper slide 11 serves to guide the projection 52 into its locking engagement with the shoulders 53 and 54. Now, therefore, considering all the above elements in the aggregate, a movement in one direction of the handle slide 18 causes a movement indicated by arrows B or C of the shipper slide 11, which rolls the gear-crank 10 along the rack 25, through a half rotation. As the belt shipper 2, with its rod 3 and the cross-head 4, are engaged with the crank pin 9, they must have the same extent of traverse movement as the latter. But the crank pin 9 has a composite movement—that due to the movement of bodily translation of the gear-crank 10 along the rack 25 and that due to the half revolution of the crank pin 9 because of the said translation. The movement of translation is a constant, but the movement due to the half revolution is a variable, depending on the throw of the crank, and has a plus or minus value dependent on the initial position of the crank. Thus, in diagram Fig. 6, the value of this movement of revolution is plus, because the total extent of travel or traverse of the crank pin (which is the movement of the belt shipper) is $c-d = e-f+2(g-h)$, where $e-f$ is the movement of translation of the crank 10, and $g-h$ the radius of throw of the crank pin 9.

In Fig. 7, the initial position of the crank pin 9 is diametrically opposite that of Fig. 6. In this case, the extent of movement $j-i$ of the crank pin $9 = (e-f) - 2(g-h)$, where, as before, $e-f$ is the movement of translation of the gear-crank 10, and $g-h$ is the radius or eccentricity of the crank pin 9. The extent of shifting can therefore be changed by employing cranks of different radius and also by reversing their initial positions on the line $k—k$. It is for this reason that the device is particularly designed to permit the ready removal of the gear-crank 10 for change in adjustment of throw of the crank pin 9, for reversing the position of the gear with a crank pin or for the substitution of a crank of different throw. When used for shifting clutches or heavy belts, it is preferable, in behalf of strength and endurance, to have no adjustability of the crank pin 9, but to secure variations in extent of shifting by the substitution for one crank of another of different throw. Where the duty imposed is light, however, an adjustable crank pin may be employed. Such adjustment may be secured in various ways. Figs. 8, 9 and 10 illustrate a simple device for the purpose. 10 is the crank gear or wheel, and to its face is secured a plate 26 in which is an eccentric aperture, having from its edge radial recesses 27 into said plate 26—Fig. 8. The crank pin 9 is embodied in a second plate 28 having a radial, projection or tongue 29, Fig. 10. This plate 28 fits the aperture of the plate 26, and its tongue 29 fits one of the recesses 27. As shown in Fig. 9, the crank pin 9 is concentric with the crank 10, but by turning the plate 28 so its tongue 29 engages some other of the recesses 27, any degree of eccentricity or throw can be secured for the crank pin 9. The crank pin plate 28 is held in the plate 26 by the screw 30, which passes through the hole 31 in the crank pin plate 28. Fig. 11 shows a different mode of securing said adjustment. The crank pin 9 is mounted on a slidable block 32 which is actuated by the screw 33.

Fig. 12 shows a modification of my improvement, in which the shipper slide which carries the gear crank 10 is actuated by the devices of my Patent No. 815,650, dated March 20, 1906—viz—by means of a pendulum or pawl, and a shifting cam controlled by the said shipper slide.

The pawl 34 is mounted on the slide 35. The cam 36 is mounted to slide on guides transversely of the pawl slide 35. When the pawl 34 is pulled down, its extremity, or a projection therefrom, engages the shipper slide 37 which corresponds with the shipper slide 11 aforementioned, and, like the latter, carries a gear crank 10. The dotted lines 39 and 40 represent long projections or ledges on the shipper slide 37 that are engaged by the pawl 34. 41, shown in dotted lines, represents a projection on the cam 36, and the dotted lines 42 and 43, projections on the shipper slide 37. Now, as the pawl 34 descends, the cam forces it to one side, causing it to engage and move the shipper slide 37 by its ledge 39. Near the extreme of the shipper slide's movement, the projection 43 engages the projection 41 of the cam and shifts the latter, so that after the pawl 34 has been returned to its original position, and then is again pulled down, it descends the opposite side of the cam and forces the shipper slide 37 in the opposite direction.

The action of the gear crank 10 is identical with that described in the earlier part of this specification. It acts upon the cross head 4 with positive, or negative effect, according as the crank pin 9 starts from a position outward from the slide 35, or inward toward it.

In Fig. 12, the device is shown applied to a clutch pulley, the member 2 then becoming the finger 2ª, for actuating the clutch mechanism. A clutch of usual and known form is indicated, 46 being the clutch pulley and 45 the fingers that actuate the clutch. 44 is a sliding collar or sleeve which, shifted by the moving member 2, is caused to engage and actuate the fingers 45.

It is obvious that my invention may be embodied in other forms of structure without departing from its spirit.

Fig. 13 shows a modification in which the pockets 12 and 13 are replaced by pawls or cams (one of which, 70, is shown) which, in conjunction with stops (one of which, 71, is shown) form the equivalent of the pockets.

Where the stress of shifting is very light, it is unnecessary to hinge the pocket-forming members, but as indicated in Fig. 14, the pockets may be formed in the carrier or a projection, 80, thereof. In this case the pawls 19 and 20 can be initially posed at so small an angle with the handle slide 18 that they will, in their return movement, ride over the outside of their respective pockets and fall back into position to engage the latter.

Fig. 15 shows the substitution of a connecting rod 47 for the cross head shoe 7, which connecting rod is preferably secured to the shipper rod by means that are variable in position on said rod, as, for example, by the collar 48.

Figs. 16 and 17 show the substitution of a cam gear 49 for the crank gear 10. In this case, the shipper slide or carrier 11 has a pin or roll 51 engaging the cam groove 50. Fig. 17 simply shows the cam, while Fig. 16, is a plan view showing the shipper slide 11 and the cam in section on the line o—o, Fig. 17.

Fig. 18 shows a form of structure in which for compactness the pawls 19 and 20 cross each other, due to a separation of their pivot or hinge points. This structure brings their projections 21 and 22 closer together at the start, making the device much more compact than would otherwise be the case.

Therefore, without limiting myself to the precise form of embodiment described, I claim:—

1. The combination with a shiftable member, of a slide having a fixed extent of movement, a crank carrier mounted on said slide, means engaging said shiftable member with said crank carrier, and means to rotate the crank carrier to impart to said shiftable member an extent of movement different from that of the slide.

2. The combination with a slide, a pawl to engage the slide, a crank gear mounted on the slide, a second slide engaged by the crank of said gear and other means also engaging the crank gear causing it to rotate and impart to the second slide an extent of movement different from that of the first.

3. The combination with a slide having pockets, of a second slide, two pawls thereon adapted, alternately, to engage the first slide by one of said pockets, and a spring to return said second slide after it has been moved to engage one of its pawls with the first slide.

4. The combination with a slide having pockets, of a second slide, two pawls thereon adapted, alternately, to engage the first slide by one of said pockets, and means to return said second slide after it has been moved to engage one of its pawls with the first slide.

5. The combination with a slide, of hinged pocket pieces on said slide, a second slide, two pawls thereon adapted to alternately engage the first slide by one or the other of the aforesaid pocket pieces to shift said slide, and means to return the second slide after it has been moved to engage one of its pawls with the first slide.

6. The combination with a movable element 2, and a slide 4 for shifting said movable element, of a rack 25, a gear 10 meshing therewith, a pin 9 eccentric to the gear 10 operatively connected with the slide 4, and means to impart a travel to the gear on the rack.

7. The combination with a movable element 2, a slide 11 for shifting said movable element, and means interposed between the movable element 2 and the slide 11 for imparting to the former a movement of different extent from the latter, of a slide 18, means on the slide 18 to engage and shift the slide 11, alternately in opposite directions, and means to restore the slide 18 to its initial position after it has been shifted to actuate the movable element 2.

8. The combination with a movable element 2, a slide 11 for shifting said movable element, and means interposed between the movable element 2 and the slide 11 for imparting to the former a movement of different extent from the latter, of a slide 18 and a pawl on the slide 18 to engage and actuate the slide 11.

9. The combination with a shiftable bar 3, a cross-head 4 secured to the bar, and a guide bar for the cross-head, of a slide 11, an adjustable crank on the slide 11, means to engage the crank with the cross-head, means to actuate the slide and means to rotate the crank.

10. The combination of a crank, a movable element shiftable by the crank, means to operate the crank through successive half rotations in alternately opposite directions and a handle to operate said means at each of its movements in one direction.

11. In a belt shifting device, the combination with a shifting element 2 and a member 4 connected with the element 2, of a crank 10 devised to begin and end its movement on the dead center, with reference to the movement of the slide 4 to lock said slide against movement, and means to impart to said crank a combined movement of translation and rotation.

12. In a belt shifting device, the combination with a shifting element 2 and an element 4 connected with the element 2, of a crank, a crank pin 9 on a dead center with reference to the movement of the slide 4, means to turn the crank through a half rotation, and means to concurrently shift said crank bodily.

13. The combination with a shifting element 2, and a cross head 4 connected therewith of a crank operatively connected with the cross-head, a slide and handle therefor, and means intermediate said handle slide and crank to rotate said crank through half rotations of alternately opposite direction in a manner substantially as described.

14. The combination with a shifting element 2 and cross-head 4, of a handle, a crank, and means intermediate the handle and the crank to turn said crank through successive half rotations of alternately opposite direction with each pull of the handle in one direction.

15. The combination with a shifting element 2, of rotatable means, means to connect the element 2 with the rotatable means, and means, including a handle, to turn the rotatable means through successive half rotations of alternately opposite directions to move the element 2 from one of two alternative positions to the other with each movement of the handle in the same direction.

16. The combination with a shifting element 2, of rotatable means, means to connect the element 2 with the rotatable means, conveying means for carrying the rotatable means bodily, means engaging the rotating means to cause the latter's rotation when moved, means to impart a travel to the conveying means and concurrently turn the rotatable means through successive half rotations of alternately opposite direction to move the element 2 with a movement whose extent is that of the conveying means, plus that due to the half rotation of the rotatable means.

17. In a shifting device, the combination with a movable belt shifting member 2, of a crank to move said member and connecting means intermediate said crank and belt shifting member, means to vary the throw of the crank and means to actuate the crank.

18. In a shifting device, the combination with a movable belt shifting member 2, of an adjustable crank to move said member and connecting means intermediate said crank and belt shifting member, means to rotate the crank, and means to concurrently move the crank bodily.

19. In a belt shifting device, the combination with a belt shifter and a cross head 4 to move the shifter, of a crank to shift the crosshead and lock it to prevent self movement, a shipper slide 11 to carry and move the said crank, means to rotate the crank, means to shift the slide and means to lock the slide to prevent self movement.

20. The combination with the sliding member of a shifting device, of a rotative traveling member having a crank-pin connected with said sliding member and means for shifting the rotative member to different positions, with the crank-pin on its dead center at the termination of each movement.

21. The combination with a shipper bar and an actuating slide movable at right angles thereto, of a carrier and means for imparting a reciprocating movement thereto from the slide, and devices intermediate the slide and shipper bar, whereby to vary the extent of sliding movement of the shipper bar without varying that of the slide.

22. The combination with a shipper bar and an actuating slide movable at right angles thereto, of a carrier and means for imparting a reciprocating movement thereto from the slide, and adjustable devices intermediate the slide and shipper bar, whereby to vary the extent of sliding movement of the shipper bar without varying that of the slide.

23. The combination of a shipper fork, a reciprocable carrier having separated bearings, means for shifting the shipper fork from the carrier, a reciprocating actuating member, arms connected to move with said actuating member and adapted to alternately engage said bearings on alternate similar movements of the actuating member to shift the carrier alternately in opposite directions.

24. The combination of a shipper fork, a carrier having separated bearings, means to shift the shipper fork from the carrier, a reciprocating actuating member, a spring tending to carry said member in one direction, and a hand pull for operating it in the opposite direction, and arms connected to move with the actuating member and adapted to alternately engage said bearings, for the purpose set forth.

25. The combination of a reciprocating slide having separated pockets or bearings and a shipper fork connected thereto, an actuating member, arms connected to move therewith to engage said pockets alternately to shift the slide first in one direction and then in the other, and means for operating said arm from the actuating member.

In testimony whereof I have signed my name to this specification in the presence of of two subscribing witnesses.

EDWIN C. SMITH.

Witnesses:
THOMAS M. CHILDS,
CHAS. A. EDDY.